United States Patent [19]

Hohenstatt

[11] Patent Number: 4,936,145
[45] Date of Patent: Jun. 26, 1990

[54] HEATABLE ELECTRIC RESISTOR FOR FLOW METERS

[75] Inventor: Martin Hohenstatt, Hammersbach, Fed. Rep. of Germany

[73] Assignee: Degussa Aktiengesellschaft, Frankfurt/Main, Fed. Rep. of Germany

[21] Appl. No.: 374,568

[22] Filed: Jun. 30, 1989

Related U.S. Application Data

[63] Continuation of Ser. No. 247,296, Sep. 21, 1988, abandoned.

[30] Foreign Application Priority Data

Sep. 22, 1987 [DE] Fed. Rep. of Germany ........................ 3731782252

[51] Int. Cl.$^5$ ............................................... G01F 1/68
[52] U.S. Cl. ................................................ 73/204.26
[58] Field of Search ........................ 73/204.25, 204.26

[56] References Cited

U.S. PATENT DOCUMENTS 4,449,402 5/1984 Eiermann et al. ............... 23/204.26

FOREIGN PATENT DOCUMENTS 0236029 11/1985 Japan ............................... 73/204.26

Primary Examiner—Herbert Goldstein
Attorney, Agent, or Firm—Beveridge, DeGrandi & Weilacher

[57] ABSTRACT

A heatable electric resistor for flow meters with short response time and as small a resistance value as possible with meandering printed lines of differing widths is obtained if separate systems of printed lines which are connected parallel to each other or are connected parallel to each other and in series are formed by means of separating cuts and if systems of printed lines which are connected parallel to each other exhibit the same electric resistance.

8 Claims, 2 Drawing Sheets

HEATABLE ELECTRIC RESISTOR FOR FLOW METERS

This application is a continuation of application Ser. No. 247,296, filed Sep. 21, 1988, now abandoned.

INTRODUCTION AND BACKGROUND

The present invention relates to a heatable electric resistor for devices for measuring the flow speed or the mass flow of gases and liquids, which consists of an electrically insulating, plate-shaped substrate whose two largest surfaces are aligned parallel to the direction of flow of the gases or liquids and onto which on one of the two largest surfaces are applied contact surfaces and printed lines as thin metal layers separated from each other by separating cuts. As a result the printed lines run in a meandering fashion with their main direction perpendicular to the direction of flow and exhibit different widths. The electric heating power density in each printed line decreases in the same degree as the local heat flow density removed by the flow with increasing distance of the particular printed line from the edge of the substrate facing the flow, i.e. the leading edge.

In order to measure the flow speeds or the mass flow of gases and liquids, especially for measuring the intake air of internal combustion engines, anemometers are used in which two temperature-dependent electric resistors are connected together to at least two temperature-independent electric resistors in a bridge circuit. The one temperature-dependent electrical resistor is electrically heated and exposed to the flow of the fluid to be measured and the other measures the temperature of the fluid. An electric control circuit assures that the heated electric resistor is maintained at a constant difference temperature relative to the temperature of the fluid.

DE-PS 31 27 081 (U.S. Pat. No. 4,449,402) describes a heatable electric resistor for anemometers, consisting of an electrically insulating, plate-shaped substrate whose two largest surfaces are aligned parallel to the direction of flow of the gases or liquids and onto which on one of the two largest surfaces are applied contact surfaces and printed lines as thin metal layers separated from each other by separating cuts. The printed lines run in a meandering fashion with their main direction perpendicular to the direction of flow and exhibit different widths. The electric heating power density in each printed line decreases in the same degree as the local heat flow density removed by the flow with increasing distance of the particular printed line from the edge of the substrate facing the flow, i.e. the leading edge. By this way one achieves a short response time for changes of the flow velocity of the fluid to be measured.

The printed lines are preferably produced by placing separating cuts with a laser in the metal layer of a plate-shaped metal film resistor so that a meandering resistor pattern or path is created.

Only the battery is available in a motor vehicle for the current supply of the measuring bridge of an anemometer, which battery can exhibit a voltage which is distinctly lower than the nominal voltage, depending on its age, state of charge and condition. It must be assured even in this instance that the anemometer remains operational, that is, that it can receive a certain power.

For this reason, the total resistance of the bridge should be maintained as small as possible. However, certain resistance values can not be dropped below for design and electrical reasons. Today, bridge resistance of approximately 20 ohms are available and the attempt is being made to achieve resistance of 10 to 15 ohms.

The resistance of a measuring bridge is essentially determined by heatable resistor $R_H$ and temperature-independent resistor $R_L$ connected to it in series. The sensitivity of a constant-temperature anemometer is optimum when $R_H$ is approximately as great as $R_L$. In practice, $R_L$ can be reduced to values of approximately 5 ohms whereas for reasons of geometry, $R_H$ was previously not able to be lowered under 10 ohms (resistance at 0° C.).

A decrease of the electric resistance value of the heatable resistor is problematic because if the number of printed lines were reduced on the substrate, the homogeneity of the temperature distribution on the substrate would be worsened. In the case of contact surfaces in the region of plate edges which are opposite each other and run parallel to the direction of flow, only an even number of separating cuts perpendicular to the direction of flow and an odd number of printed lines are possible. In the case of a surface of approximately $9 \times 2$ mm$^2$, approximately 11 ohms are obtained in a 1 $\mu$m-layer of platinum with e.g. 5 printed lines and approximately 3.5 ohms with 3 printed lines. Thus, the electric resistance can only be varied in large steps and, moreover, only a very rough adaptation of the local production of heat to the heat flow density removed locally by the flow can be achieved, which results in a lengthened response time.

SUMMARY OF THE INVENTION

It is an object of the invention to create a heatable electric resistor for devices measuring the flow speed or the mass flow of gases and liquids which exhibit as small an electric resistance value as possible while retaining or improving the homogeneity of the temperature distribution on the substrate and with a standardized substrate size of the same magnitude. Moreover, it should also be possible to achieve certain electric resistance values in as precise a manner as possible which are set by properties of the electric control circuit.

A feature of the present invention resides in heatable electric resistors for devices for measuring the flow speed or the mass flow of gases and liquids which comprise an electrically insulating, plate-shaped substrate whose two largest surfaces are aligned parallel to the direction of flow of the gases or liquids. Onto one of these largest surfaces are applied contact surfaces and printed lines as thin metal layers separated from each other by separating cuts. The printed lines run in a meandering fashion with their main direction perpendicular to the direction of flow and exhibit different widths. The electric heating power density in each printed line decreases in the same degree as the heat flow density removed locally by the flow with increasing distance of the particular printed line from the edge of the substrate facing the flow, i.e. the leading edge.

An important aspect of the invention resides in the fact that systems of printed lines which are connected parallel to each other or parallel to each other and series-connected are formed in the metal layer by means of separating cuts parallel and perpendicular to the direction of flow, that separating cuts running parallel to the direction of flow separate areas with the same number of printed lines and with the same dependency of the widths of the printed lines on their respective distances from the leading edge and that the printed lines of one area belong to one system of printed lines and the printed lines of areas which are separated by a separating cut parallel to the direction of flow belong to systems of printed lines connected in parallel to each other exhibit the same electric resistance values.

A further feature of the invention is a heatable electric resistor according to the above wherein a printed line is associated over its entire length in an unambiguous manner with one system of printed lines.

The contact surfaces can either be located each on a plate end in the region of opposing plate edges which run parallel to the direction of flow or both on one such plate end.

Preferably, one system of printed lines is connected in series to a compound system which is formed by connecting at least two systems of printed lines in parallel.

BRIEF DESCRIPTION OF DRAWINGS

The invention will be further understood by reference to the drawings wherein.

DETAILED DESCRIPTION OF THE INVENTION

Figure 1:
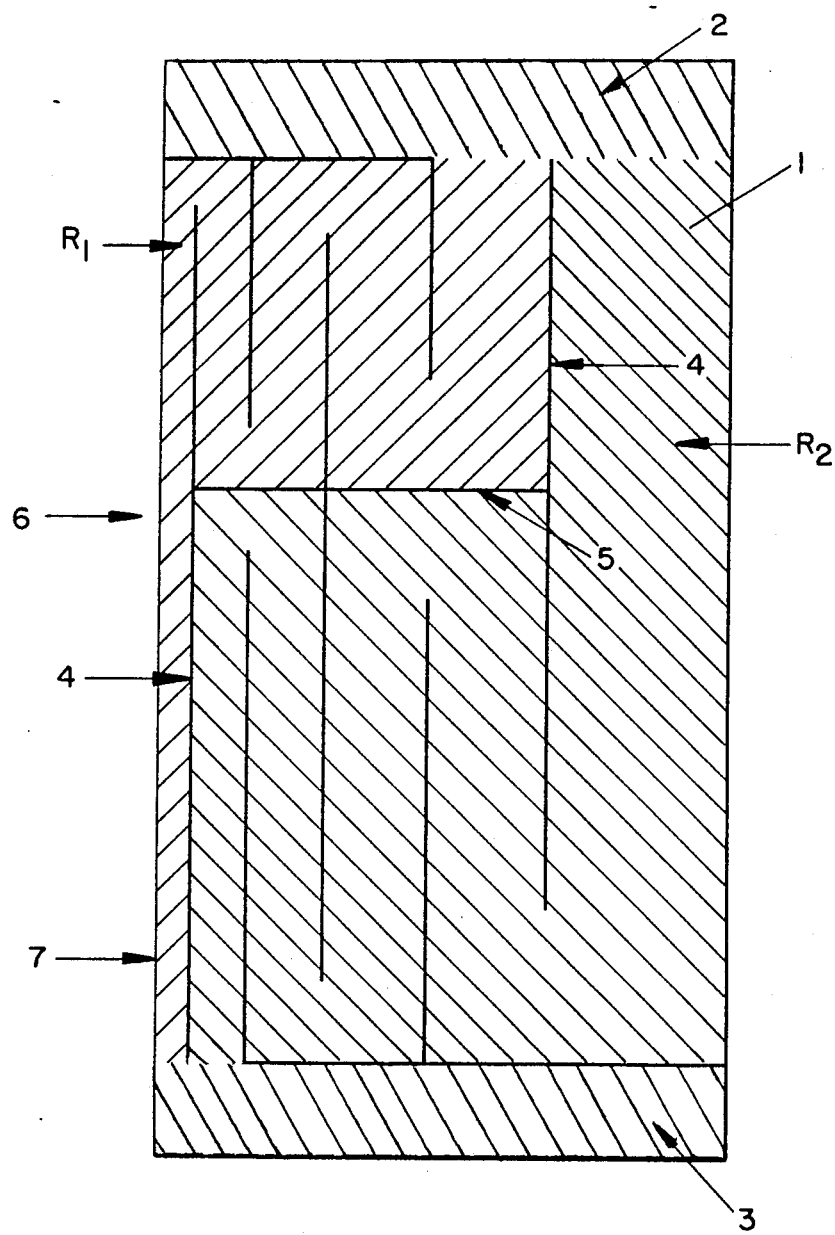
FIG. 1 is a schematic representation of a heatable resistor of the invention.

In carrying out the invention the metal layer on the substrate is divided by separating cuts parallel and perpendicular to the direction of flow into systems of printed lines which are either connected parallel to each other or parallel to each other and in series. The separating cuts running parallel to the direction of flow separate areas with the same number of printed lines and with the same dependency of the widths of the printed lines on their particular distances from the leading edge. In addition, parallel-connected systems of printed lines must exhibit the same electric resistance values.

It is preferable if a printed line is associated over its entire length in an unambiguous manner with one system of printed lines.

The contact surfaces can either be located each on a plate end in the region of opposing plate edges which run parallel to the direction of flow or both on one such plate end.

It is advantageous if a system of printed lines is serially connected to a compound system formed by connecting at least two systems of printed lines in parallel.

It is also advantageous if in the case of a parallel connection of two systems of printed lines, the first printed line or the first and at least once two directly following printed lines of the one system of printed lines and the last printed line or the last and at least once two directly preceding printed lines of the other circuit system extend over the entire length of the substrate perpendicular to the direction of flow except for the areas of the contact surfaces, in which instance the first printed line runs along the leading edge and the last printed line along the opposite edge.

By connecting systems of printed lines in parallel achieves a reduction of the electric resistance value in comparison to a non-compound system of printed lines which occupies the same area as the parallel connection and exhibits the same number of separating cuts vertical to the direction of flow and printed lines of equivalent widths. On the other hand, however, in the case of parallel connection it is possible to achieve a better adaptation of the electric heating power density to the heat flow density removed locally by the flow with retention or slight elevation of the electric resistance value by increasing the number of separating cuts vertical to the direction of flow which are partially interrupted. It is possible to achieve electric resistance values in a finer gradation by means of the possibility of combining series connection and parallel connection of systems of printed lines.

In the case of an electric resistor of the same dimensions as in the above example which is constructed by parallel connection from two systems of printed lines, approximately 4 ohms are obtained in the case of 5 separating cuts and in the case of 7 separating cuts approximately 8 ohms. A further intermediary value of approximately 7 ohms is obtained if in the case of 5 partially interrupted separating cuts vertical to the direction of flow one system of two printed lines is series-connected to two systems of printed lines connected parallel to one another.

It is of decisive importance that no temperature gradient develops perpendicular to the direction of flow as a result of the connection of systems of printed lines during the electric heating of the electric resistor. This would result in a lengthening of the response time. Therefore, the number of printed lines and their dependency of the widths on their respective distances from the leading edge must be the same in areas which are separated by separating cuts running parallel to the direction of flow. It is also a condition that the printed lines of one such area belong to one system of printed lines and the printed lines of areas which are separated by a separating cut parallel to the direction of flow belong to systems of printed lines connected in parallel to each other which exhibit the same electric resistance values. For the same reason, a printed line must be associated over its entire length in an unambiguous manner with one system of printed lines. Only in this manner can it be assured that the same electric heating power is generated everywhere along any imagined line perpendicular to the direction of flow (and outside of the separating cuts). The two FIGS. 1, 2 show the heatable resistor in two embodiments presented as examples in schematic fashion.

FIG. 1 shows a top view of a plate-shaped substrate onto which a thin metal layer 1 has been applied onto one of its largest surfaces. The substrate is arranged in such a manner that its two largest surfaces are aligned parallel to the direction of flow 6 of a fluid. Metal layer 1 is structured by separating cuts into contact surfaces 2, 3 and meandering printed lines whose main directions run perpendicular to the direction of flow 6 and whose widths increase as their respective distances from the leading edge 7 increase. Two parallel-connected systems of printed lines $R_1$, $R_2$ are formed by separating cuts vertical (4) to and parallel (5) to the direction of flow 6. Separating cut 5 running parallel to direction of flow 6 is arranged asymmetrically in order that the two circuit systems $R_1$, $R_2$ exhibit the same electric resistance. The difference in width of the first printed line of $R_1$ and of the last printed line of $R_2$, calculated in each instance from the leading edge, is compensated by the differing length of the two systems of printed lines. These two printed lines extend over the entire length of the substrate vertical to the direction of flow with the exception of the area of the contact surfaces. The width $a_i$ of the transition between lines i and i+1 is as large as the average value of the widths $b_i$ and $b_{i+1}$. See FIG. 2.

Figure 2:
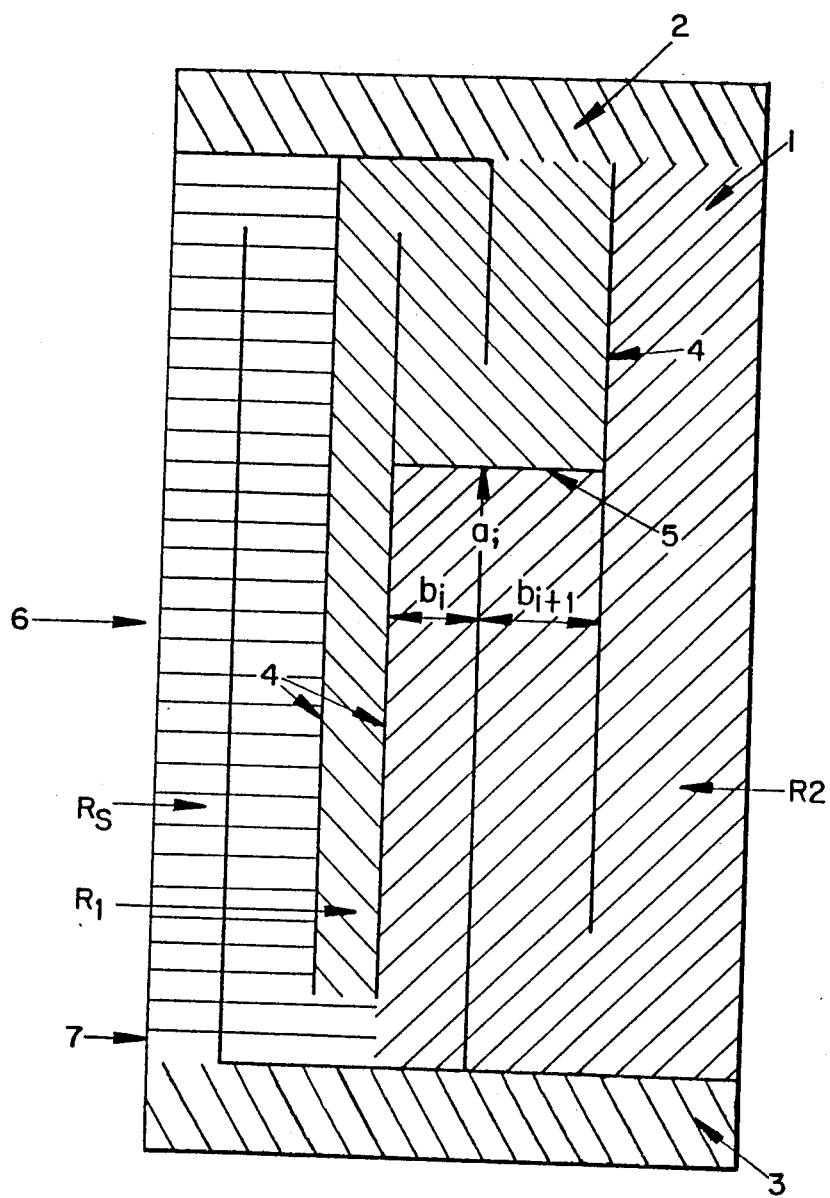
FIG. 2 is a schematic representation of another embodiment of the invention.

The plate-shaped substrate of FIG. 2 is arranged as in FIG. 1 and is likewise coated with a thin metal layer 1.

The latter is structural by separating cuts into contact surfaces 2, 3 and meandering printed lines whose main directions run perpendicular to the direction of flow 6. Two parallel-connected systems of printed lines $R_1$, $R_2$ are formed by separating cuts vertical (4) to and parallel (5) to direction of flow 6 which systems are series-connected to another system of printed lines $R_S$. The widths of the printed lines increase, considered separately only for each system of printed lines, with their respective distances from the leading edge 7. The printed lines of the parallel-connected systems $R_1$, $R_2$ are relatively narrower when considering their particular distances from leading edge 7 than those of system of printed lines $R_S$ connected thereto in series because only a part of the total current with which the heatable electric resistor is heated flows through $R_1$ and $R_2$. Separating cut 5 running parallel to the direction of flow is arranged asymmetrically in order to achieve equality of the electric resistance values of systems $R_1$, $R_2$ connected to one another in parallel.

Further variations and modification will be apparent to those skilled in the art and are intended to be encompassed by the claims appended hereto.

We claim:

1. A heatable electric resistor apparatus for measurement of flow speed or mass flow of a flowing medium, said apparatus comprising:

an electrically insulating substrate provided in the form of a plate to have two relatively large surfaces which can be aligned parallel to the direction of flow, and a facing edge which defines a plane which can be aligned perpendicular to the direction of flow; and thin metal layers on one of said large surfaces of said substrate, said layers being cut by cut lines which extend in directions both parallel and perpendicular to the direction of flow to define contact surface, a first system of printed lines which forms a first meandering path of electrical resistance, and a second system of printed lines which forms a second meandering path that has the same electrical resistance as said first path and is electrically in parallel with said first path, said paths comprising an equal number of said printed lines, said printed lines of both paths being generally oriented in a direction perpendicular to the direction of flow and having widths that vary in the direction of flow away from that printed line of each path which is nearest said facing edge of said substrate so that the electrical heating power density in each printed line decreases in the same degree as the heat flow density removed locally by the flowing medium.

2. An apparatus as claimed in claim 1, wherein between said contacts, said resistance paths are electrically isolated from each other.

3. An apparatus as claimed in claim 1, wherein said contact surfaces are provided at regions including opposite end edges of said substrate, said opposite edges and therefore said contact surfaces extending generally parallel to the direction of flow.

4. An apparatus as claimed in claim 1, wherein said contact surfaces are provided at a region including an edge of said substrate, said edge extending generally parallel to the direction of flow.

5. An apparatus as claimed in claim 1, wherein said first and second paths have ends which are situated next to each other, and said apparatus further comprises a third system of printed lines which forms a third resistance path connecting said situated ends of said first and second paths to one of said contact surfaces, said printed lines of said third path being generally oriented in a direction perpendicular to the direction of flow and having widths that vary in the direction of flow away from a printed line of said third path which is nearest said facing edge of said substrate so that the electrical heating power density decrease in the same degree as the heat flow density removed locally by the flowing medium.

6. An apparatus as claimed in claim 1, wherein one printed line of said first path and one printed line of said second path each extend, in a direction perpendicular to the direction of flow, over the entire length of said side of said substrate between said contacts.

7. An apparatus as claimed in claim 6, wherein said one printed line of said first path which extends over the length of said substrate side is provided in a region including a leading edge of said substrate side and said one printed line of said second path which extends over the length of said substrate side is provided in a region including the edge opposite said leading edge.

8. An apparatus as claimed in claim 1, wherein the width of the transition between two adjacent printed lines of a path is an average value of the widths of such adjacent lines.

* * * * *